(No Model.)
G. A. COLTON.
SLIDING DOOR HANGER.
No. 433,721. Patented Aug. 5, 1890.
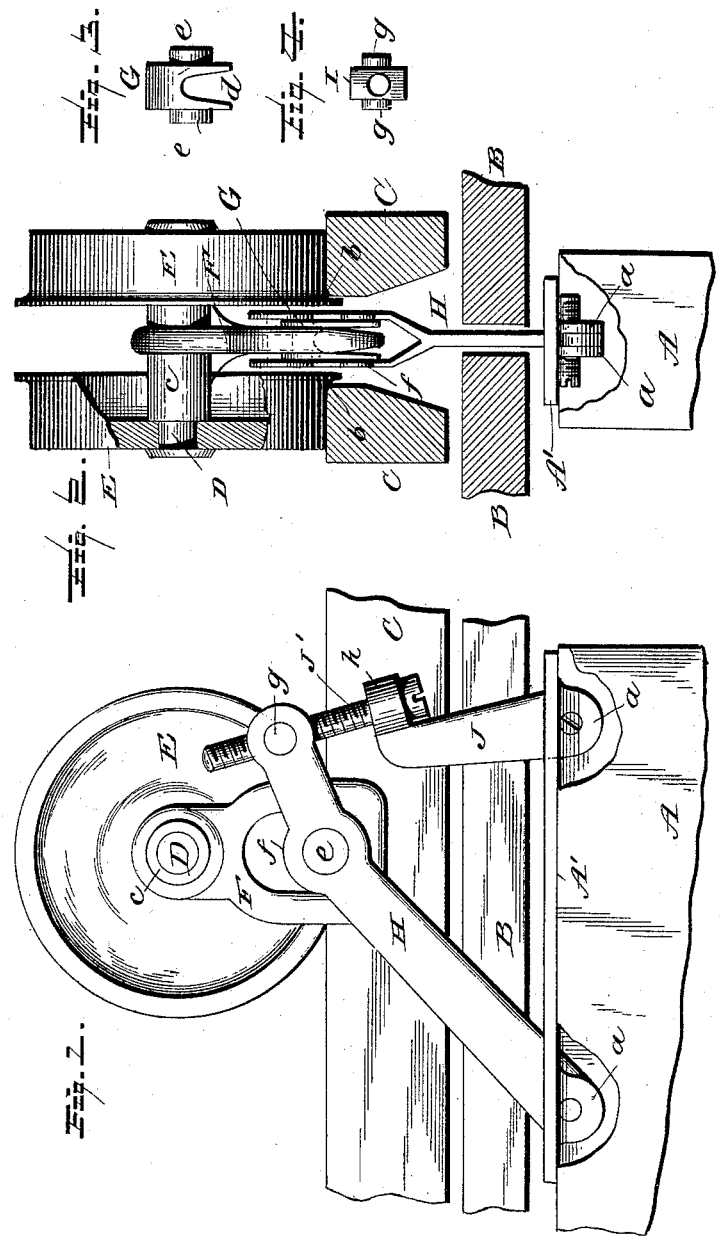
Witnesses
L. C. Hills.
E. H. Bond.
Inventor
George A. Cotton,
E. B. Stocking
Attorney

UNITED STATES PATENT OFFICE.

GEORGE A. COLTON, OF CHICAGO, ILLINOIS.

SLIDING-DOOR HANGER.

SPECIFICATION forming part of Letters Patent No. 433,721, dated August 5, 1890.

Application filed April 16, 1890. Serial No. 348,246. (No model.)

*To all whom it may concern:*

Be it known that I, GEORGE A. COLTON, a citizen of the United States, residing at Chicago, in the county of Cook, State of Illinois, have invented certain new and useful Improvements in Sliding-Door Hangers, of which the following is a specification, reference being had therein to the accompanying drawings.

This invention relates to certain new and useful improvements in sliding-door hangers; and the novelty resides in the peculiar combinations and the construction, arrangement, and adaptation of parts, all as more fully hereinafter described, shown in the drawings, and then particularly pointed out in the appended claims.

The invention is clearly illustrated in the accompanying drawings, which, with the letters of reference marked thereon, form a part of this specification, and in which—

Figure 1 is a side elevation showing one of my improved hangers applied to a door. Fig. 2 is a vertical cross-section, with parts shown in end elevation and others broken away to better disclose other parts. Fig. 3 is a face view of the box removed. Fig. 4 is a top plan of the pivoted nut removed.

Like letters of reference indicate like parts in the figures where they occur.

Referring now to the details of the drawings by letter, A designates the upper portion of a door; B, the soffits, and C the track upon which the wheels run. To the upper edge of the door there is affixed a plate A', provided upon its under face with lugs or ears *a*, which are seated in suitable chambers therefor in the upper edge of the door, as shown in Fig. 1, and this plate has two openings, one near each end adjacent to the said ears or lugs for the passage of the parts connecting the said plate with the axle of the wheels, and which will soon be described.

D is the axle, and E the wheels fast thereon, the wheels being designed to run upon the track in the ordinary manner, the inner upper edges of which are preferably rounded, as shown at *b* in Fig. 2. The axle is provided with a sleeve *c*, as shown, and from this sleeve is suspended the saddle F in the form of a stirrup, as shown, the upper end being a ring-like portion which is sleeved upon the sleeve *c*, or the sleeve and saddle may be formed integral, if desired, as shown in Fig. 1. On the lower cross portion of the saddle rests a box G, which is shown in detail in Fig. 3, and which has a bifurcated portion *d* to engage the round bearing on the saddle, and with trunnions *e*, which are journaled in the enlargement *f* of the strap H, as shown in Fig. 1, the lower end of the said strap being pivotally connected with one of the lugs or ears *a* on the plate A', as shown in Fig. 1. This forms a rounded bearing or connection between the saddle and strap and provides for easy movement of the parts.

The strap H is preferably bifurcated at its upper end, as shown in Fig. 2, to embrace the saddle, and should be formed of thin flat metal, so as to allow the soffits to come close together.

The joint between the saddle and strap or hanger is substantially on a line with the top of the track, thus bringing the joint low down, so as to prevent side movement of the door.

The strap H is extended beyond its connection with the box and saddle, and is provided with the nut I, which is pivoted thereto by means of the trunnions *g*.

J is a strap pivoted at its lower end in the ears *a* of the plate A', and at its upper end provided with a right-angled portion *h*, through which is passed a screw J', which is threaded into the said nut I, as shown. The door is adjusted by means of this screw and its connection with the plate and strap H.

What I claim as new is—

1. The combination, with the axle, of the saddle supported thereon, the plate adapted to be affixed to the upper edge of a door, and the strap pivotally connected with the plate and having a rolling connection with the saddle, as set forth.

2. The combination, with the axle and wheels, of the saddle supported on the axle, the plate adapted to be affixed to the upper edge of a door, the strap pivotally connected with said plate and having a rolling connection with the saddle, and an adjustable connection between the strap and plate, substantially as specified.

3. The combination, with the axle and wheels, of the saddle supported from the axle, the strap, the box having trunnions journaled in the strap and having a rounded bearing on the saddle, as set forth.

4. The combination, with the axle and wheels, of the saddle supported from the axle, the strap, the removable box having trunnions journaled in the strap and having a rounded bearing on the saddle, and adjusting means connected to one end of the strap, substantially as specified.

5. The combination, with the axle, wheels, saddle, and strap having a rounded pivotal connection with the saddle, of the pivot-nut on the end of the strap, the plate, the strap pivotally connected thereto, and the adjusting-screw connecting the last-mentioned strap with the nut, substantially as specified.

In testimony whereof I affix my signature in presence of two witnesses.

GEORGE A. COLTON.

Witnesses:
HENRY H. MUNGER,
CHAS. L. MUNGER.